US012118039B2

(12) United States Patent
Lysak et al.

(10) Patent No.: US 12,118,039 B2
(45) Date of Patent: Oct. 15, 2024

(54) VISUALLY EXPLORING IMPLICIT FEATURES OF HIERARCHICAL GRAPHS BASED ON ATTRIBUTES OF NODES OF THE GRAPHS

(71) Applicant: International Business Machines Corporation, Armonk, NY (US)

(72) Inventors: Maksym Lysak, Waedenswil (CH); Viktor Kuropiatnyk, Horgen (CH); Nikolaos Livathinos, Adliswil (CH); Cesar Berrospi Ramis, Zurich (CH); Peter Willem Jan Staar, Zurich (CH); Abderrahim Labbi, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 17/667,974

(22) Filed: Feb. 9, 2022

(65) Prior Publication Data

US 2023/0252078 A1 Aug. 10, 2023

(51) Int. Cl.
  *G06F 16/901* (2019.01)
(52) U.S. Cl.
  CPC ...... *G06F 16/9024* (2019.01); *G06F 16/9027* (2019.01)
(58) Field of Classification Search
  None
  See application file for complete search history.

(56) References Cited

U.S. PATENT DOCUMENTS

| | | |
|---|---|---|
| 6,496,208 B1 | 12/2002 | Bernhardt |
| 6,897,885 B1 | 5/2005 | Hao |

(Continued)

FOREIGN PATENT DOCUMENTS

CN 105260611 B 11/2018

OTHER PUBLICATIONS

Wittenburg, Kent, and Louis Weitzman. "Qualitative visualization of processes: Attributed graph layout and focusing techniques." International Symposium on Graph Drawing. Berlin, Heidelberg: Springer Berlin Heidelberg, 1996. pp. 401-408. (Year: 1996).*

(Continued)

*Primary Examiner* — Tony Mahmoudi
*Assistant Examiner* — Umar Mian
(74) *Attorney, Agent, or Firm* — Caleb D. Wilkes

(57) ABSTRACT

A computing system, program products and computer-implemented method of exploring data comprises accessing data structures and executing an interaction loop. Data structure captures connected graph nodes associated with attributes containing human-readable data. Interaction loop receives user-selected attributes associated with focal nodes and executes subroutines to determine layouts of an arborescence extending from focal nodes. The subroutines use starting nodes and pivot attributes as arguments. Identifying nodes of subroutines are connected to starting nodes by walking the graph and comparing pivot attributes with attributes associated with connected nodes, obtaining distance-dependent quantities. Subroutines compute layout data, including coordinates of the connected nodes. Coordinates are determined in accordance with the distance-dependent quantities. Interaction loop displays arborescence according to the layout data. Subroutines can be recursively executed, whereby, at each recursion level of execution, it is called with the selected attribute and each node of a selection of nodes, as a starting node.

20 Claims, 11 Drawing Sheets

(56) References Cited

U.S. PATENT DOCUMENTS

| | | |
|---|---|---|
| 6,995,768 B2 | 2/2006 | Jou |
| 7,367,006 B1 | 4/2008 | O'Riordan |
| 8,010,909 B1 | 8/2011 | Hanson |
| 8,132,122 B2 | 3/2012 | Risch |
| 8,949,742 B2 | 2/2015 | Molesky |
| 9,454,291 B2 | 9/2016 | Helfman |
| 9,633,091 B2 | 4/2017 | Stolte |
| 9,928,646 B2 | 3/2018 | Chew |
| 2003/0174179 A1 | 9/2003 | Suermondt |
| 2005/0192926 A1 | 9/2005 | Liu |
| 2008/0246769 A1 | 10/2008 | Milov |
| 2011/0141923 A1 | 6/2011 | Young |
| 2015/0193519 A1 | 7/2015 | Mandelstein |
| 2018/0300039 A1 | 10/2018 | Roloff |
| 2019/0340304 A1 | 11/2019 | Bak |
| 2020/0334238 A1 | 10/2020 | Sherman |

OTHER PUBLICATIONS

Pavlo, Andrew, Christopher Homan, and Jonathan Schull. "A parent-centered radial layout algorithm for interactive graph visualization and animation." arXiv preprint cs/0606007 (2006). (Year: 2006).*

Liang, Jie, et al. "Angular treemaps—a new technique for visualizing and emphasizing hierarchical structures." 2012 16th International Conference on Information Visualisation. IEEE, 2012. pp. 74-80. (Year: 2012).*

Munzner, Tamara, "Exploring Large Graphs in 3D Hyperbolic Space", IEEE Computer Graphics and Applications, Jul./Aug. 1998, pp. 18-23.

Munzner, Tamara, "Interactive Visualization of Large Graphs and Networks", Dissertation submitted to the Department of Computer Science and the Committee on Graduate Studies of Stanford University, Jun. 2000, 167 pages.

Staar et al., "Corpus processing service: A Knowledge Graph platform to perform deep data exploration on corpora", Applied AI Letters, Accepted Nov. 25, 2020, DOI: 10.1002/ail2.20, 15 pages.

* cited by examiner

VISUALLY EXPLORING IMPLICIT FEATURES OF HIERARCHICAL GRAPHS BASED ON ATTRIBUTES OF NODES OF THE GRAPHS

BACKGROUND

The present disclosure relates in general to the field of computer-implemented methods and computer-program products for exploring data of connected graphs. In particular, it is directed to methods enabling a user interaction loop, in which a user selects an attribute associated with a focal node, for the method to recursively compute an arborescence extending from the focal node, by comparing the pivot attribute with attributes associated with nodes that are connected to the focal node.

In graph theory, a graph is a network representation of objects (nodes) and their relations (called links or edges). If a link between any two nodes of the graph is asymmetrical, the graph is said to be directed. If any two nodes are connected by exactly one sequence of links, the graph is a tree. A tree may include a special node (the root), from which every link originates, directly or indirectly. This particular graph is called a directed rooted tree and it is a common structure in computer sciences for representing hierarchical data. A tree can be regarded as a hierarchical graph. For instance, a corporate hierarchy may be represented by a rooted tree. In that case, the root node typically refers to the headquarters or identifies the overall company, and is linked to other nodes representing, e.g., subsidiaries, branches, and/or other companies controlled by the main company. Other examples include organizational reporting structures, where nodes represent employees and links capture levels of management, as well as geographical location hierarchies like regions, countries, cities, or postal codes.

In addition, nodes and links can be associated with values or symbolic labels (called attributes or features) representing properties like the country where the company is located or the main economic activity (industry) of such as company, notably in the case of large multinational organizations.

SUMMARY

According to a first aspect, the present disclosure is embodied as a computer-implemented method of exploring data and accompanying system and computer program product comprising a computer readable storage medium having program instructions embodied therewith executable by processing means of a computerized system to cause to perform steps of the computer-implemented method. The method comprises accessing a data structure and executing an interaction loop based on the accessed data structure. The data structure captures a connected graph (e.g., a directed rooted tree) having nodes connected through edges, where the nodes are associated with attributes containing human-readable data. The interaction loop comprises receiving a user selection of an attribute associated with a focal node and executing a subroutine to determine a layout of an arborescence extending from the focal node. The subroutine uses a starting node and a pivot attribute as arguments. In operation, the subroutine is called with the focal node and an attribute selected by the user. The subroutine identifies nodes connected to the starting node by walking the graph. It subsequently compares the pivot attribute with attributes associated with the connected nodes identified to obtain corresponding distance-dependent quantities (e.g., similarity-based quantities). Finally, the subroutine computes layout data that includes coordinates of the connected nodes identified. The coordinates are determined in accordance with the distance-dependent quantities obtained. Eventually, the interaction loop displays the arborescence according to the layout data computed.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings.

The accompanying drawings show simplified representations of devices or parts thereof, as involved in embodiments. Similar or functionally similar elements in the Figures have been allocated the same numeral references, unless otherwise indicated.

Figure 1:
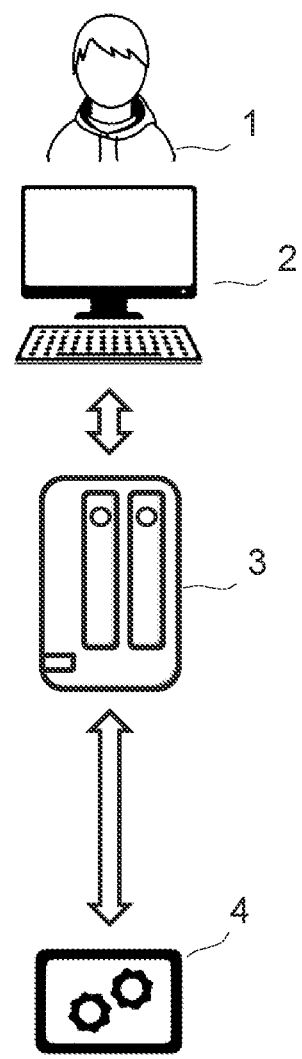
FIG. 1 is a diagram illustrating an embodiment of a computing environment comprising a user interacting with a computerized system to explore data of a connected graph, where some of the required computations are off-loaded to a hardware accelerator, as described herein in accordance with the present disclosure.

Computerized methods and computer program products embodying the present invention will now be described, by way of non-limiting examples.

DETAILED DESCRIPTION OF EMBODIMENTS OF THE INVENTION

The following description is structured as follows. General embodiments and high-level variants are described in section 1. Section 2 addresses exemplary embodiments. Section 3 concerns technical implementation details. Note, the present method and its variants are collectively referred to as the "present methods". All references Sn refer to methods steps of the flowcharts of FIGS. 6-10, while numeral references pertain to devices, components, and concepts involved in embodiments of the present invention.

1. General Embodiments and High-Level Variants

Embodiments of the present disclosure recognize that exploring large graphs can be challenging for data analysis tasks. For instance, in 2021, the Global Legal Entity Identifier Foundation (GLEIF) identified more than 1.8 million corporate legal entities connected with ca. 177,000 links representing ownership relationships. The present disclosure recognizes and understand how valuable efficient graph visualization may be in such cases, provided that the graph visualization is able to display information adequately and efficiently. Ideally, an effective visualization solution should allow the user to quickly assimilate the information displayed, and easily identify trends, patterns, and data clusters.

One challenge in graph visualization is the allowed interactivity, in order to improve the user experience when navigating the graph. There are several methods of building graph layouts in 2D or 3D scenes. Interactive visualization techniques support various navigation and exploration methods. For example, some methods focus on the spatial layout and the visual encoding of the graph visualization. Deliberate distortion techniques can be applied to address the spatial layout challenge of showing as much important information as possible. Such methods consider the spatial position of the graph nodes and links as a fundamental substrate of the visualization. On top of it, additional information can be added through several marks (visual encoding) such as size, color, or shape, independent of their spatial position. Other methods display the different attributes of the nodes, with color coding or by rendering context information on separate windows. These visual encodings and windows may change dynamically upon receiving user inputs, such as moving the mouse pointer or selecting a specific area of the graph. Some methods strive to present the graphs in a compact manner, while graph attributes appear in separate tables. Sometimes, thumbnails are used to display node information and ease the graph navigation.

In terms of spatial layout, some visualization techniques are based on hierarchical and rule-based algorithms Some systems propose to render hierarchical data stored in relational databases in a tree structure, representing nodes in an indented list, without requiring or allowing much interaction from the user. Other techniques propose a less rigid layout, whereby sibling nodes are radially arranged, though the spatial layout is still determined by the hierarchical relationships. To tackle the scalability challenge, some algorithms rely on a two-step process, where an initial graph is displayed to the user, who can then select a specific node as a root and a maximum depth level for subsequent visualization. Other systems use a ranking function to sort the nodes according to a concept of node importance. Nodes can sometimes be laid out on the surface of an arch or hemisphere in a 3D space. The whole layout is still uniquely determined by the number of nodes and their hierarchical relationships. By construction, all such visualization techniques exploit explicit relationships across the graph nodes.

The developed techniques of the present disclosure leverage node attributes for determining the spatial layout of a connected graph, beyond the usual link properties (i.e., parent-child or ancestor-successor properties). In particular, the techniques described herein have developed user interaction techniques that allow the spatial layout of a hierarchical graph to be deterministically changed by selecting different attributes. Such techniques lend themselves well to the discovery of implicit properties of and patterns in of data structure explored, while preserving explicit relationships across the graph nodes.

Figure 2:
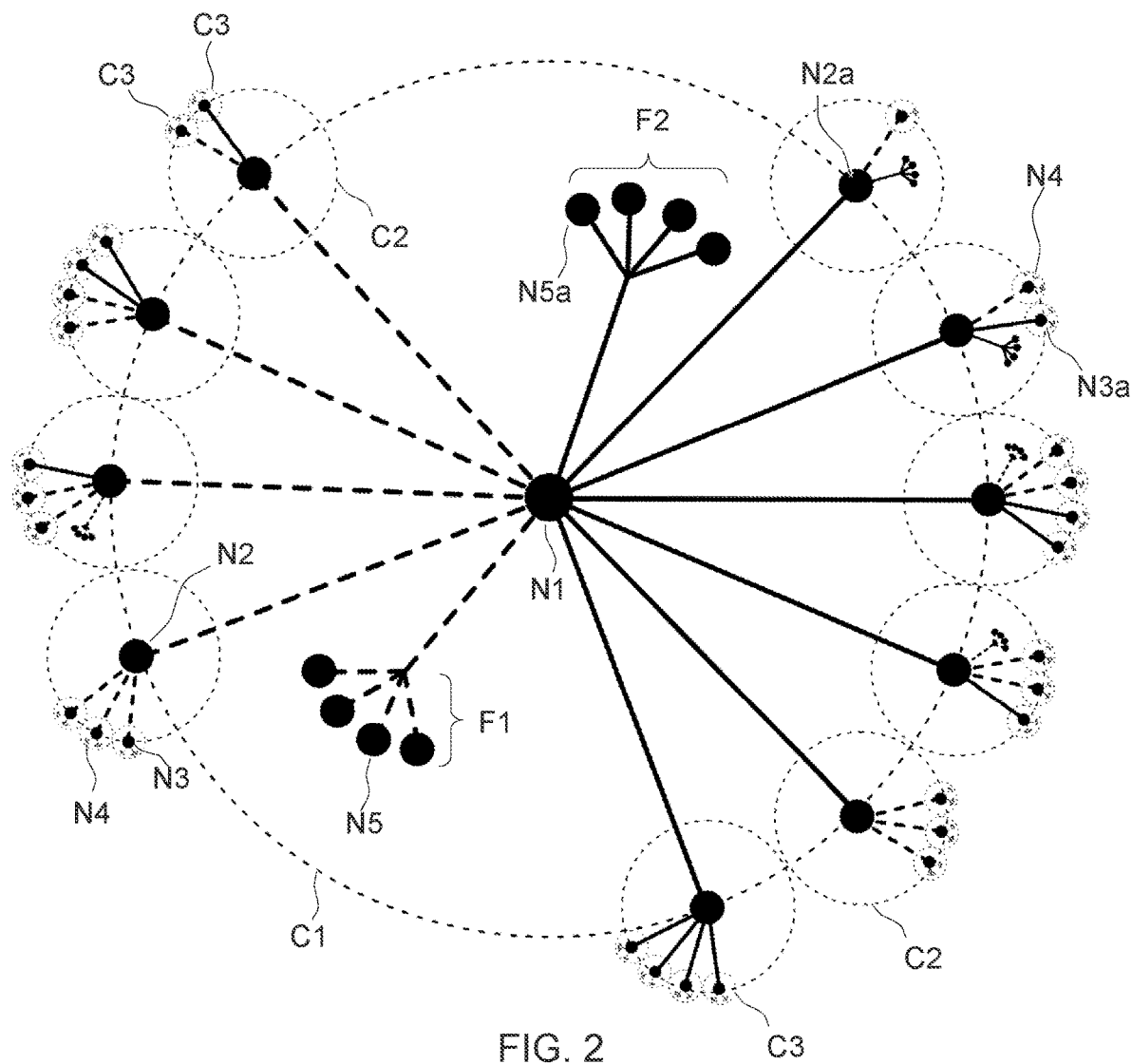
FIG. 2 schematically illustrates an embodiment of a view of a graphical user interface displaying nodes of a connected graph according to a layout of an arborescence computed using a recursive procedure described herein in accordance with the present disclosure.
Figure 6:
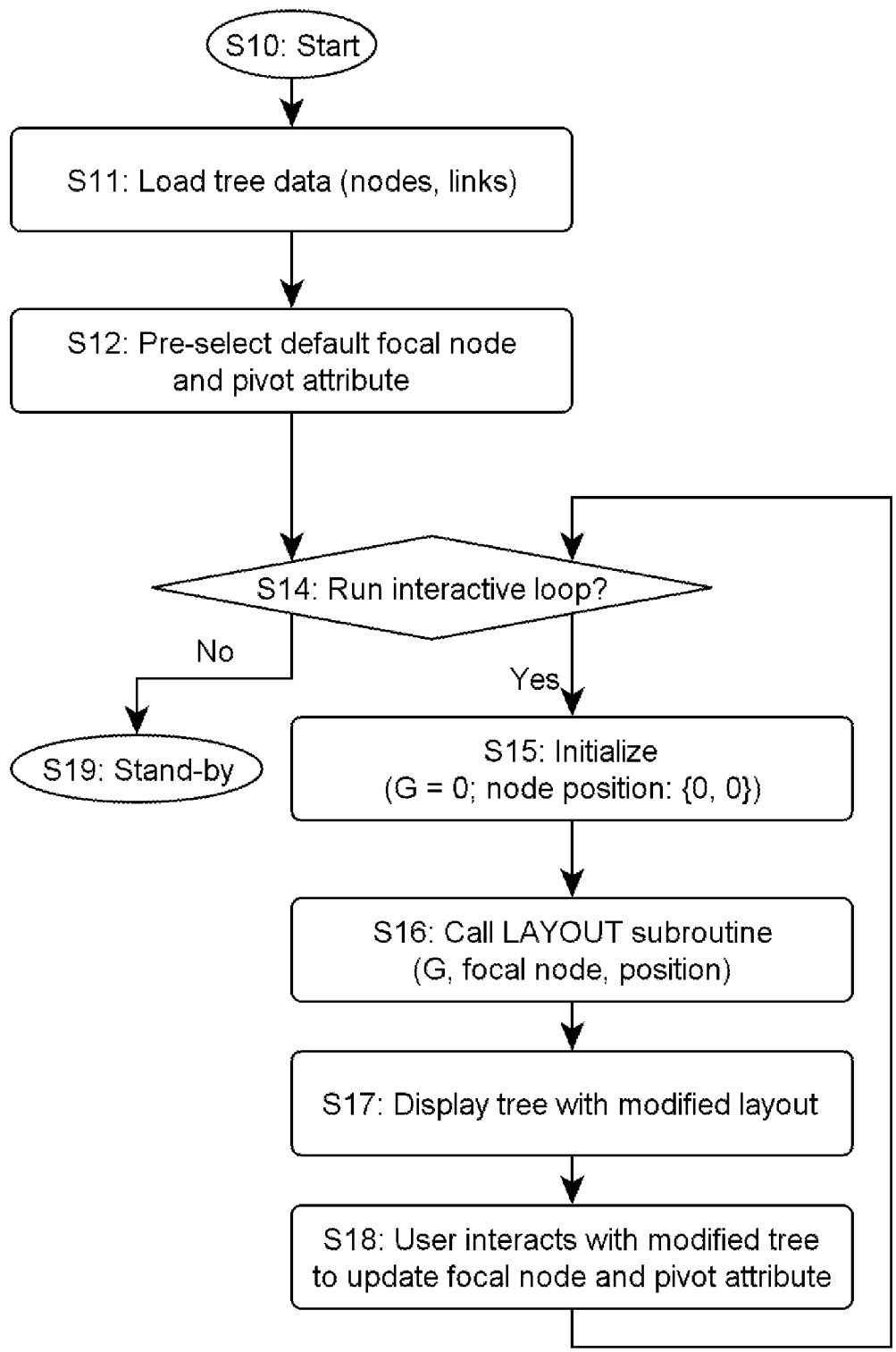
FIG. 6 depicts a flowchart illustrating high-level steps of an embodiment of a method for exploring data, including a user interaction loop calling a LAYOUT subroutine.
Figure 7:
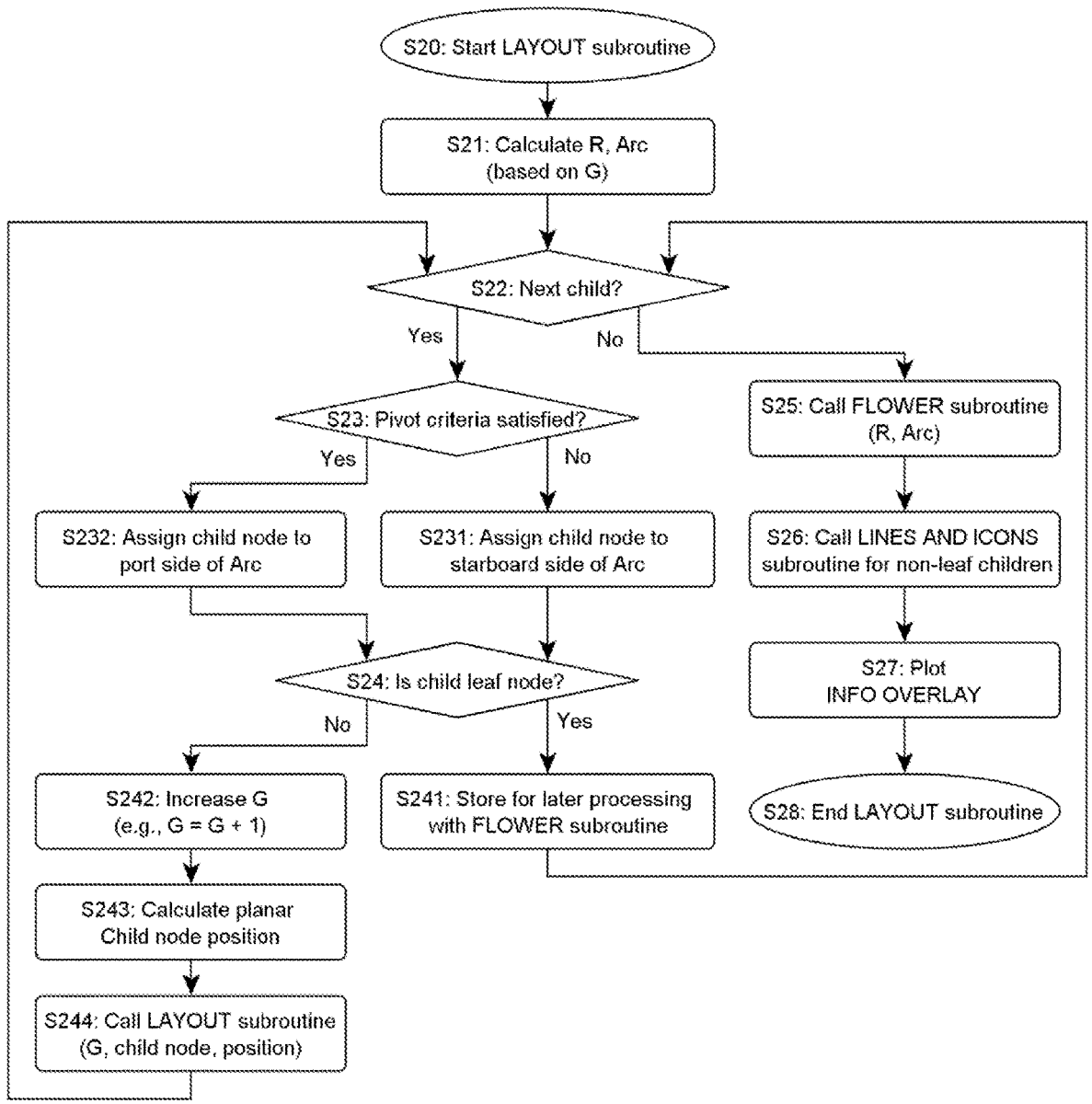
FIG. 7 depicts a flowchart illustrating an embodiment of a LAYOUT subroutine of a method for exploring data, wherein during arborescence construction, the LAYOUT subroutine can call itself (it is recursive), as well as the peripheral subroutines.

A first aspect of the present disclosure is described in detail in reference to FIGS. 2, 6, and 7. This aspect concerns a computer-implemented method of exploring data. The method may notably be implemented by one or more computerized devices 2, 3, 4, as illustrated in FIG. 1.

Figure 5:
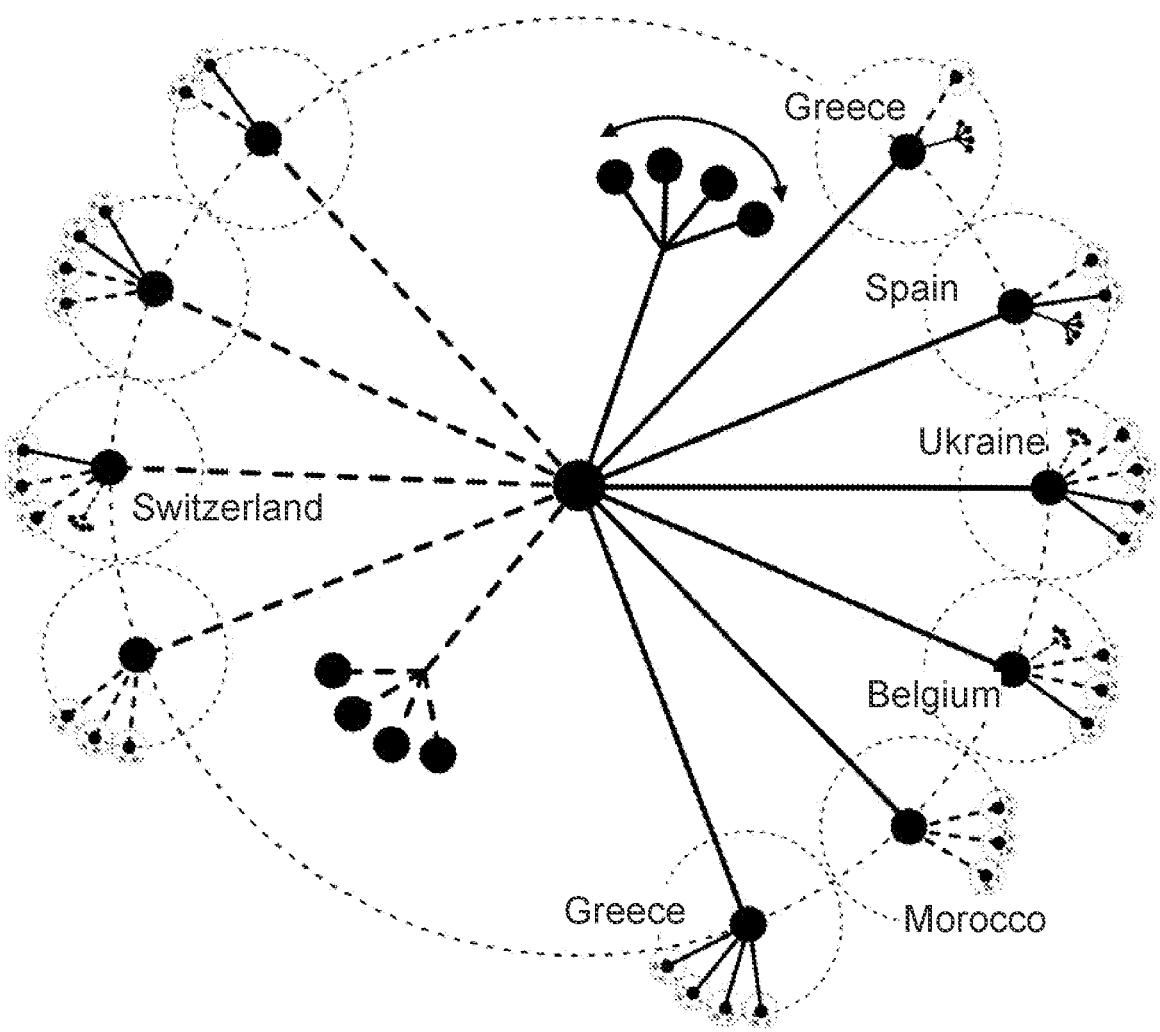
FIG. 5 depicts an embodiment of a graphical user interface displaying nodes of a connected graph displaying the same arborescence as shown in FIG. 2, onto which selected node attributes are overlaid onto the connected graph to help the user navigation, as described herein in accordance with the present disclosure.

The method relies on a data structure capturing a connected graph. The graph has a number of nodes (including nodes N1-N5a shown in FIG. 2), which are connected through edges. As usual, such nodes may notably correspond to entities (e.g., real-world entities, such as countries (as shown in the example of FIG. 5), organizations, companies, affiliates, individuals, products, etc.), concepts or activities (services, processes, etc.), while the edges (also called links) capture relationships between such entities (e.g., hierarchical or causal relationships). As a whole, the graph may possibly represent any complex system, such as an IT system, a physical, chemical, or biological system, for example. In the present context, the nodes of the graph are further assumed to be associated with attributes containing human-readable data, such as names, functions, and geographical indications. The attributes of a node capture information about the entity represented by this node.

As seen in the flow of FIG. 6, the method starts at step S10 and accesses the initial data structure at step S11. Accessing the data structure means accessing data of the data structure, which may require to download or stream such data, prior to loading them (at least partly) in the main memory of a computer. The data structure does not necessarily need to be entirely loaded in memory; it may be loaded step by step, as needed for layout computation purposes. For example, the algorithm may query data on demand, whereby the relevant data is retrieved in chunks.

The method executes an interaction loop at steps S14-S18 based on the accessed data structure. This interaction loop may involve various types of user inputs, as discussed later in detail. The interaction loop may involve the selection of an attribute associated with a special node which is called the focal node N1 herein, for reasons discussed later. The user selection of this attribute is received by the underlying algorithm at step S18.

A subroutine can be executed based on the user selection received, as shown by steps S20-S28 of the flowchart exemplified in FIG. 7. The aim is to determine at steps S25-S27 a layout of an arborescence extending from the focal node N1. This subroutine may be referred to as a "LAYOUT" subroutine in FIG. 6 and FIG. 7. The LAYOUT subroutine notably uses a starting node and a pivot attribute as arguments. The subroutine is called (step S16) with the focal node N1 (as a starting node) and the attribute as previously selected by the user (i.e., the pivot attribute).

Executing the LAYOUT subroutine notably causes step S22 to identify nodes N2-N5a connected to the starting node, by simply walking the graph captured by the accessed data structure. Note that, so far, only the explicit relations of the graph are being used. However, the LAYOUT subroutine further compares, via step S23, the pivot attribute with attributes that are associated with the connected nodes N2-N5a identified at step S22. The LAYOUT subroutine makes it possible to obtain distance-dependent quantities for the connected nodes. I.e., the underlying distances represent distances between the connected nodes and the starting node as per the compared attributes. This point is discussed below in detail.

The LAYOUT subroutine further computes, in steps S25-S27, layout data based on the distance-dependent quantities obtained. The layout data notably include coordinates of the connected nodes N2-N5a identified. Such coordinates are determined in accordance with the distance-dependent quantities obtained. Embodiments of the user interaction loop displays during step S17, the arborescence according to the layout data computed.

The data structure accessed contains at least a connected graph. In some embodiments, the accessed data structure may contain several disconnected graphs. In that case, a first graph can be selected by default, while the other graphs may be ignored, or may be treated separately. In the exemplary embodiment, the graph may be a connected acyclic graph, i.e., a tree. In variants, however, the graph may contain cycles, which can be handled at runtime. For example, in some embodiments, edges (such as the first edges encountered) may be selected by default, whereas cyclic edges (as later encountered) can simply be ignored, for the purpose of determining the arborescence layout. Apart from edges resulting in cycles, the algorithm preserves the initial tree structure as much as possible. I.e., the connections displayed between the nodes correspond to actual edges in the initial graph, even if only sub-structures of this graph are eventually displayed. Where the initial graph is an acyclic graph, the algorithm may entirely preserve the initial graph; the displayed structure will either correspond to the initial graph or a sub-structure thereof.

As noted earlier, the accessed data structure can capture a directed tree. In situations where the data structure is a directed tree, the LAYOUT subroutine explores child nodes N2-N5a from the focal node N1, along the directed edges. In practice, the directed tree may be a directed rooted tree. In that case, the nodes (also called vertices) are connected by way of directed edges (or links) from a root node of the tree. A directed rooted tree may refer to a structure in computer science representing hierarchical data. This document sometimes refers to the corresponding graph as a hierarchical graph.

Embodiments of the graph do not need to be a directed rooted tree. Embodiments of the graph may be a directed tree but not necessarily a rooted tree. Any node may potentially become a focal node N1, once selected by the user, such that the LAYOUT subroutine may keep on descending nodes from the focal node, thanks to the directed edges. I.e., because the links that connect the nodes are directed in that case, the algorithm can progressively explore the child nodes thanks to the directed edges. The links do not necessarily need to be directed. In that case, the algorithm may gradually explore nodes connected to the focal node, thanks to the undirected links. In other words, the algorithm works from the focal node outwards, which is the only direction needed. The outward direction is defined by the focal node and links from that focal node. When a new node is chosen as a focal node, then the algorithm works outwards from this new node, considering the connected nodes similarly to child nodes of a root node in a directed rooted tree. That said, in practice, the underlying graph will likely be an acyclic graph and, typically, a directed rooted tree.

The interaction loop involves user interaction with a user interface, which notably includes a graphical user interface (GUI). The interaction loop typically prompts the user to provide inputs, which, in turn, causes to repeatedly execute the LAYOUT subroutine. In preferred embodiments discussed below in detail, the LAYOUT subroutine is recursively called, e.g., for at least two hierarchical levels from the focal node. Three hierarchical levels are assumed in FIG. 2. The LAYOUT subroutine can for instance be implemented as a function or a procedure, the execution of which produces layout data (including coordinates) in output or modifies such coordinates. That is, the LAYOUT subroutine can be devised as a function that returns layout data or as a procedure that modifies such layout data. The LAYOUT subroutine may for instance determine relative coordinates of the nodes in respective regions defined relative to the starting node. In the accompanying drawings, such regions are defined as complementary half disks, circumscribed in circles surrounding the starting node, at each recursion level. More generally, the regions can be defined as areas of any shape in a 2D or 3D rendering scene.

The LAYOUT subroutine obtains an arborescence, i.e., a tree-like representation of the initial graph or sub-structures thereof, which extends from the focal node. A new arborescence is determined each time a new focal point is selected and/or a new attribute is selected. Again, the initial tree structure is preserved, inasmuch as links between nodes of the depicted structure reflect relationships that are already present in the initial graph.

The layout data can be obtained based on distance-dependent quantities, where the distance-dependent quantities are computed by comparing attributes of the nodes. Such distance-dependent quantities may for instance be distances obtained according to any suitable metric. The distance-dependent quantities may equally be similarities, which are, in some sense, the inverse of distances. Note, in that respect, that the primarily computed quantities may be similarities or distances. For example, distances may be computed, which correspond to semantic, syntactic, and/or numerical distances between the attributes (and not to path lengths). The pivot attribute can be semantically, syntactically, and/or numerically compared in step S23 with the attributes associated with the connected nodes N2-N5a identified. In practice, the comparison operation typically involves an equality or an inequality. Such distances can for instance be computed as absolute differences between numbers, Euclidean distances between vectors (e.g., embedding vectors for semantic comparisons), or edit distances for strings.

In some instances, underlying distances do not always need to be explicitly computed. Moreover, as noted above, similarity measurements may be used in place of distances. For example, a similarity s can be defined as $s=1/(1+d)$, where d is a numeric distance. Plus, the distance-dependent quantities do not necessarily need to be computed as numbers. For instance, similarities may possibly be computed (instead of distances) as Booleans. For example, taking the value TRUE (when the compared attributes match) or FALSE (when they do not). Still, a match (TRUE) and mismatch (FALSE) can be regarded as corresponding to zero and non-zero distances, respectively. As should be understood, any distance measurement can also be regarded as a similarity measurement (the lower the distance the more similar the attributes). Conversely, any similarity measurement can be regarded as a distance measurement. Thus, the term "distance-dependent quantities" should be interpreted in a broad sense, so as to notably encompass similarity measurements and Boolean values, as exemplified above. Such quantities can equivalently be regarded as similarity-dependent quantities and equivalently depend on the extent of similarity between the attributes.

In some embodiments which are computationally efficient, the comparison performed at step S23 may simplify down to testing, for each node of the identified nodes, whether an associated attribute is equal to the pivot attribute or not. As a result, the corresponding distance is equal to zero, or not. I.e., being equal to zero means a zero distance or a maximal similarity. Otherwise, the distance is non-zero (e.g., it may be infinite), in which case the similarity is zero. Again, the distances may only be implicit where (in) equalities are tested, resulting in Booleans. In variants, if the compared values are numerical values, then the values may possibly be quantized (i.e., bucketed), such that comparing attribute values of two nodes amounts to testing whether they belong to a same bucket of values or not. Note, in further variants, classes of attributes may similarly be compared.

Beyond the mere edges between nodes, the proposed approach uses node attributes to assist the building of the layout and, as such, eases the discovery of hidden data patterns and implicit features of the tree, which would be difficult to identify with methods that solely leverage relationships across hierarchical nodes. Thus, the present methods help the user build a better understanding of the explored data, by allowing the user to select attributes of potential interest to the user, which causes the user to rebuild the graph layout.

Embodiments of the interactive loop allow the user to choose a pivot attribute, by selecting an attribute of interest (e.g., one of the attributes associated with the focal node). In turn, the value of the pivot attribute impacts the computed layout. To that aim, the attribute values of the child nodes are compared with the pivot attribute selected. For example, subtrees of child nodes having a same attribute value as the pivot attribute can be systematically displayed in a port region, else they are displayed in a starboard region. On the contrary, prior algorithms do not typically rely on selected attributes to modify the layout.

The proposed approach is well-suited for visualizing hierarchical data and is compatible with datasets of any data cardinality. Embodiments described herein give rise to visualization layouts that are persistent with the user-selected pivot, which, in turn, allows a reproducible navigation to be achieved. I.e., such embodiments involve deterministic algorithms In addition, the embodiments discussed below address fundamental visualization problems, such as cognitive mapping, data navigation, and data exploration.

All this is now described in detail, in reference to particular embodiments of the invention. To start with, referring more particularly to FIGS. 2 and 7, the LAYOUT subroutine can advantageously be recursively executed. That is, at each recursion level of its execution, the LAYOUT subroutine is called during step S244 with each node of a selection of nodes, i.e., nodes N2-N3a, where such nodes are selected from the connected nodes N2-N5a identified at step S22. I.e., each of these nodes is used as a starting node, in addition to the currently selected attribute, for executing the LAYOUT subroutine. This procedure is recursive because each of the nodes may have connected nodes, which would cause to further call the subroutine.

Figure 4:
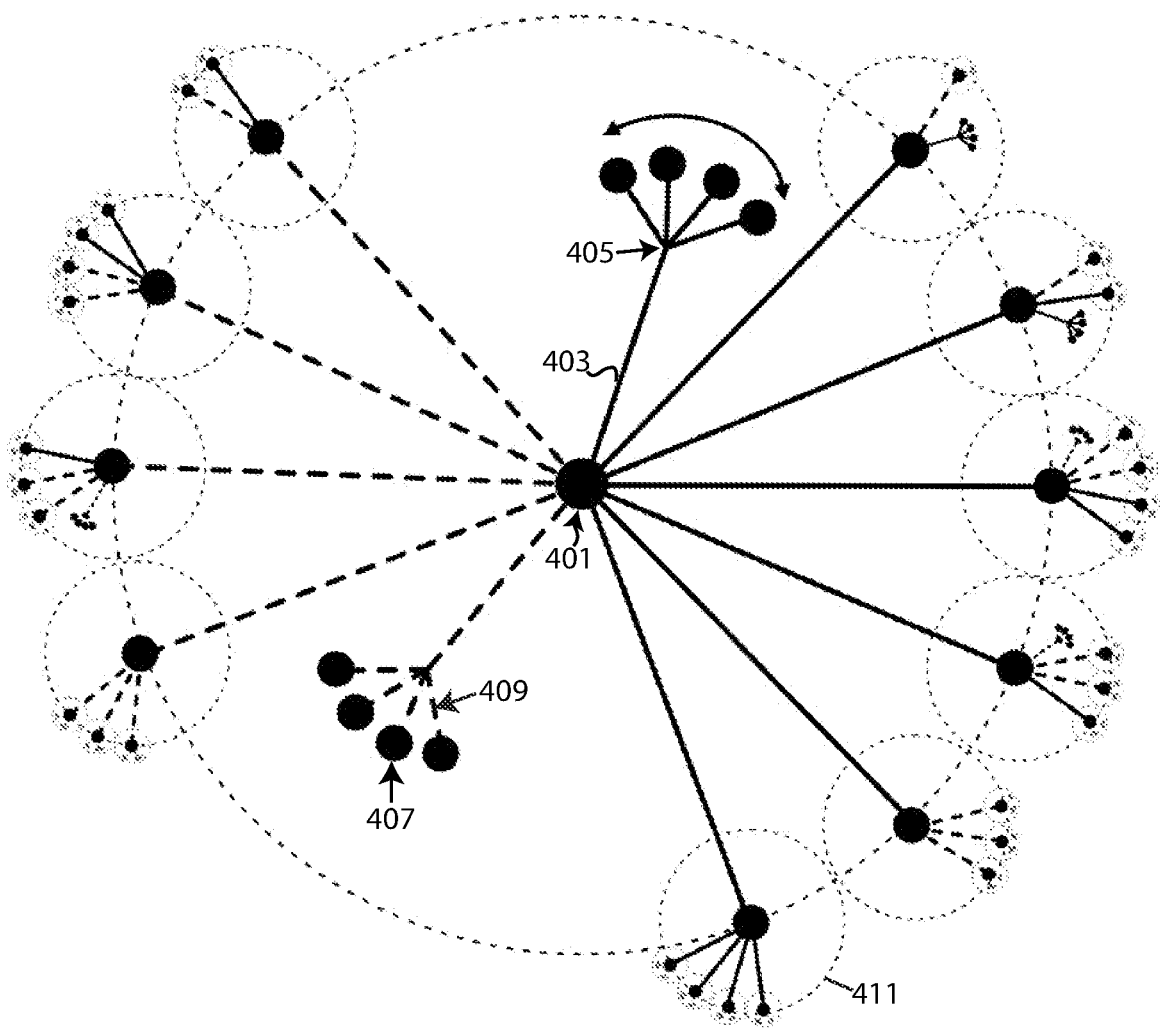
FIG. 4 depicts an embodiment of an arborescence and describes the types of nodes and edges displayed as described herein in accordance with the present disclosure.

The selected nodes typically correspond to non-leaf nodes 411 when the graph is a directed rooted tree. In case of a directed rooted tree, there may be at least as many additional calls as there are non-leaf nodes 411 of the focal node (i.e., parent node 401 in FIG. 4 or focal node N1 in FIG. 2), and the recursion may be extended to deeper levels, because of nodes connected to the selected nodes. However, the recursion depth can be set to be less than a maximal depth from the focal node N1. For example, assuming that the graph is a directed tree, the subroutine can be recursively executed according to a maximal recursion depth, which is set to be less than the maximal depth of the directed tree, as measured from the focal node (i.e., N1 in FIG. 2). The maximal recursion depth can for instance be set to 2, 3, or 4. In FIG. 2, the maximal recursion depth is configured to a value of 3. The maximal recursion depth parameter may be automatically determined at runtime or set as a configuration parameter by the user. This parameter may possibly affect performance when very large graphs are involved. The parameter may possibly be set automatically at runtime, according to features of the underlying graph, e.g., the graph or sub-graph cardinality. In practice, setting the maximal recursion level to 4 to 5 recursion depths will typically not be an issue, even for graphs involving thousands of nodes. Where very deep trees are involved, the recursion depth can purposely be limited, while data can be streamed on demand as the focal node changes.

In some embodiments the subroutine is recursively executed and the layout data computation is self-organized by the algorithm, upon walking the tree. At each recursion level of its execution, the subroutine is called with the selected attribute, as well as each node of a selection of nodes (as a starting node). Such nodes are selected among the connected nodes identified. In a directed tree, the identified nodes are child nodes of the starting node; the selected nodes are non-leaf nodes of the tree. Preferably, the subroutine is recursively executed according to a maximal recursion depth, which is set to be less than a maximal depth of the directed tree from the focal node. The execution of the recursive subroutine can advantageously be off-loaded (at least partly) to a hardware accelerator, to achieve near real-time interactive rendering. For example, the layout data may be computed by defining, at each recursion level, two distinct regions relative to the starting node, e.g., a starboard region and a portside region. Then, for each node of the identified child nodes, a region is selected according to a respective one of the distance-dependent quantities obtained for each node. The coordinates of each node are determined in the correspondingly selected region. Leaf nodes preferably form distinct groups of nodes, where nodes in each group are arranged along a bow and joined by respective edges depicted as pedicels, the latter branching from an involucre of a peduncle connected to a parent node. The pivot attribute may possibly be semantically, syntactically, and/or numerically compared with the attributes associated with the connected nodes identified. In preferred embodiments, though, the comparison comprises testing, for each node of the identified nodes, whether an associated attribute is equal to the pivot attribute or not, for simplicity.

In the example of FIG. 2, the connected graph is assumed to be a directed rooted tree. In that case, the connected nodes N2-N5a identified at step S22 are child nodes of the starting node (corresponding to the focal node N1 at the first recursion level). In addition, the selection of nodes used to recursively call (in step S244) the LAYOUT subroutine are non-leaf nodes N2-N4 of the tree (a non-leaf node 411 is a node that is not a leaf node 407 of the directed tree). Note, the focal node (such as parent node 401) may potentially be selected by the user irrespective of the root node of the tree.

As further seen in FIGS. 2 and 7, the recursive subroutine may further define distinct regions at each recursion level. That is, in some embodiments, the computation of the layout data causes, at each recursion level, to define in step S21, two distinct regions relative to the starting node. Coordinates of each node of the identified child nodes N2-N5$a$ can notably be determined as follows: First, one of the two distinct regions is selected (see steps S23, S231, and S232) according to the distance-dependent quantity obtained for this node by comparing in step S23 the pivot attribute with attributes associated with this node. Then, coordinates of this node are determined in steps S241-S244, and step S251, within the selected region. This contributes to help solve clashing issues and simplifies the computations, inasmuch as coordinates are constrained to lie in predetermined regions. Moreover, this also makes the results easier to comprehend for the user who navigates the tree. The distinct regions defined at step S21 may for instance be 2D regions (which coincide with the display region). For example, such regions may be defined as complementary half disks (or half-circles). In some variants of the proposed embodiment, the distinct regions may be defined as complementary 3D regions. For example, as complementary sphere portions (instead of 2D half disks or circles), as in embodiments discussed below.

In exemplary embodiments, the two distinct regions are defined in step S21 as symmetric, complementary regions. For example, the two distinct regions defined at step S21 at each recursion level can be regarded as two complementary halves of an n-ball, where n=2 (2D case) or 3 (3D case). The two halves are circumscribed by an n−1-sphere centered on the starting node. Note, a 1-sphere is a circle and is the boundary of a 2D disk (also called a 2-ball), while a 2-sphere is an ordinary sphere in 3D Euclidean space and is the boundary of an ordinary ball (also called 3-ball). For example, choosing n=3 results in that the two regions correspond to two halves of a 3-ball, bounded by a 2-sphere. Choosing n=2 results in that the two regions correspond to two halves of a 2D disk, delimited by an ordinary circle, as assumed in the accompanying drawings. In all cases, the two complementary half n-disks are rendered in the visualization plane, e.g., using projection techniques, if necessary.

When working in 2D, a particularly simple abstraction can be used, whereby nodes are branched in the region corresponding to the port side or the complementary region (the starboard side), as assumed in FIGS. 2-5. When working in 3D, a similar approach can be used, although the layout complexity rises significantly. Accordingly, it is often preferred to work with 2D regions.

The dimension of the n−1-spheres may be decreased in step S21 at each recursion level, to ease the depiction of the gradually increasing numbers of nodes. In embodiments described in section 2, this dimension reduction is captured by the parameter G. The dimension of each n−1-sphere may for instance be inversely proportional to the node depth of the child nodes identified by the LAYOUT subroutine, i.e., the distance or the length of the path between such a child node and the focal node. Note, this reduction of dimension may also result from the fact that coordinates are first computed in a hyperbolic space and then projected in the 2D visualization plane, as in embodiments discussed below. Doing so optimizes the space available for depicting the nodes.

Recursively executing the LAYOUT subroutine causes a number of n−1-spheres, at each recursion level to be defined. The dimensions of the n−1-spheres can advantageously be determined in accordance with this number, in addition to the node depth, so as to help resolve for clashing between nodes N1-N5$a$ to be displayed as part of the arborescence.

As noted above, the node coordinates may possibly be computed in a hyperbolic space. In computationally advantageous variants, however, the node coordinates are computed in step S243 in a curvilinear coordinate system. More precisely, the coordinates of the selected nodes may first be determined in step S243 in the curvilinear coordinate system and then shrunk in step S243 in the 2D plane corresponding to the visualization plane. In practice, the visualization plane may be referred to as the screen space, the viewport, or the display region. For example, node coordinates may be computed in a polar coordinate system (when n=2) or in a spherical coordinate system (where n=3). However, dimensions shrink at each recursion level, to mimic computations in a hyperbolic space. For example, one may first compute coordinates using polar coordinates and then shrink the coordinates using a shrink factor S to inherently embed space curvature in the results. I.e., the curvature of the space is controlled by the shrink factor (the real positive number S). If S is in [0, 1], the curvature is reduced, else, if S>1 the curvature is increased. A more costly approach is to first compute the coordinates in a hyperbolic space and then project the resulting coordinates in the 2D plane. A hyperbolic space is a non-Euclidean, homogeneous space that has a constant negative curvature. The coordinates can be determined to solve spatial clashing for branches, as well as to limit the overall space of visualization to a finite planar size.

As evoked earlier, an exemplary approach can systematically define port regions and starboard regions, at each recursion level. That is, at each recursion level except for the very first recursion level, the region selected in steps S231 and S232 for each child node (identified at step S22) is the port region if the corresponding distance-dependent quantity is less than or equal to a threshold distance (i.e., S23: Yes), else the region selected is the starboard region (i.e., S23: No). The port region and the starboard region corresponds to a port side and a starboard side, respectively, of a direction extending from the starting node (to which the identified child nodes are connected) to the n−1-sphere corresponding to the child nodes N2-N5$a$. In other words, the two regions correspond to the port and starboard side of the previously chosen direction, i.e., the direction defined by the parent node 401 from which the identified child nodes branch out. The visualization is built iteratively, so as for nodes to successively branch outwardly. At the very first level, the port side and the starboard side corresponds to the left and right regions as seen from the user's viewpoint (the user faces the display). At subsequent recursion levels, the situation can be compared to that of a ship moving along the line extending outwardly from the starting node (initially the focal node N1,) to each (non-leaf) child node. And each time the ship stops at a node, a decision is made on how to branch out child nodes, which can branch out either to port side (left) or the starboard side (right) of the ship.

As further seen in FIG. 2, the node coordinates can further be constrained to lie at the periphery of their respective regions. More precisely, the node coordinates can be determined in such a manner that non-leaf nodes N2-N3$a$ are arranged along the periphery of the respectively selected half region, i.e., one of the two complementary halves of the n-ball. Doing provides a systematic depiction basis, which help solve for clashing and eases the user's comprehension of the rendered scene.

Meanwhile, leaf nodes 407 are better placed in inner regions, closer to the starting node, for the sake of space optimization. That is, the node coordinates can further be determined so that leaf nodes N5, N5a of the identified child nodes N2-N5a are arranged in an inner portion of a respectively selected regions (i.e., one of the two complementary halves). For example, leaf nodes 407 may be arranged about the periphery of a smaller circle than the circle used to depict the non-leaf nodes 411. So, the leaf nodes 407 are placed closer to the starting node, at least at the first recursion level, as exemplified by nodes N5, N5a of FIG. 2, compared with child non-leaf child nodes N2, N2a. A similar scheme is preferably applied at each recursion level, as depicted by nodes N3, N3a, N4 in FIG. 2.

In addition, leaf nodes 407 are preferably clustered. Namely, the leaf node 407 coordinates can be determined so that leaf nodes 407 that have a same parent node 401 in the tree form a distinct group of nodes in the inner portion of the respectively selected half region. I.e., leaf nodes 407 are clustered in accordance with their parent nodes 401 and are plotted together under their respective parent node 401, in a form of a segment that does not clash with the rest of the visualization as exemplified by nodes N5 and N5a of FIG. 2. Moreover, leaf nodes 407 can be depicted according to a flower-like arrangement, i.e., an inflorescence. That is, all leaf nodes 407 such as leaf nodes N5, N5a in a same distinct group are arranged along a bow F1 and joined by respective edges, which are depicted as pedicels 409 in FIG. 4. The pedicels 409 are from the involucre 405 of a peduncle 403 that is connected to that same parent node 401. I.e., leaf nodes N5, N5a are plotted according to an inflorescence, which can be determined thanks to, e.g., the FLOWER LAYOUT subroutine of FIG. 8. A flower includes a peduncle 403 extending from the parent node 401 up to the involucre 405 (the end of the peduncle 403), from which multiple pedicels 409 branch to connect to respective leaf nodes 407 arranged along the flower bow F1. Thus, the complete layout can be formed as an arborescence leading to inflorescences. Not only this botanic inspiration makes it natural for users to comprehend, but, in addition, it simplifies computations, inasmuch as it constrains (and thus eases) the placement of the nodes and thus help resolve for clashing.

Figure 11:
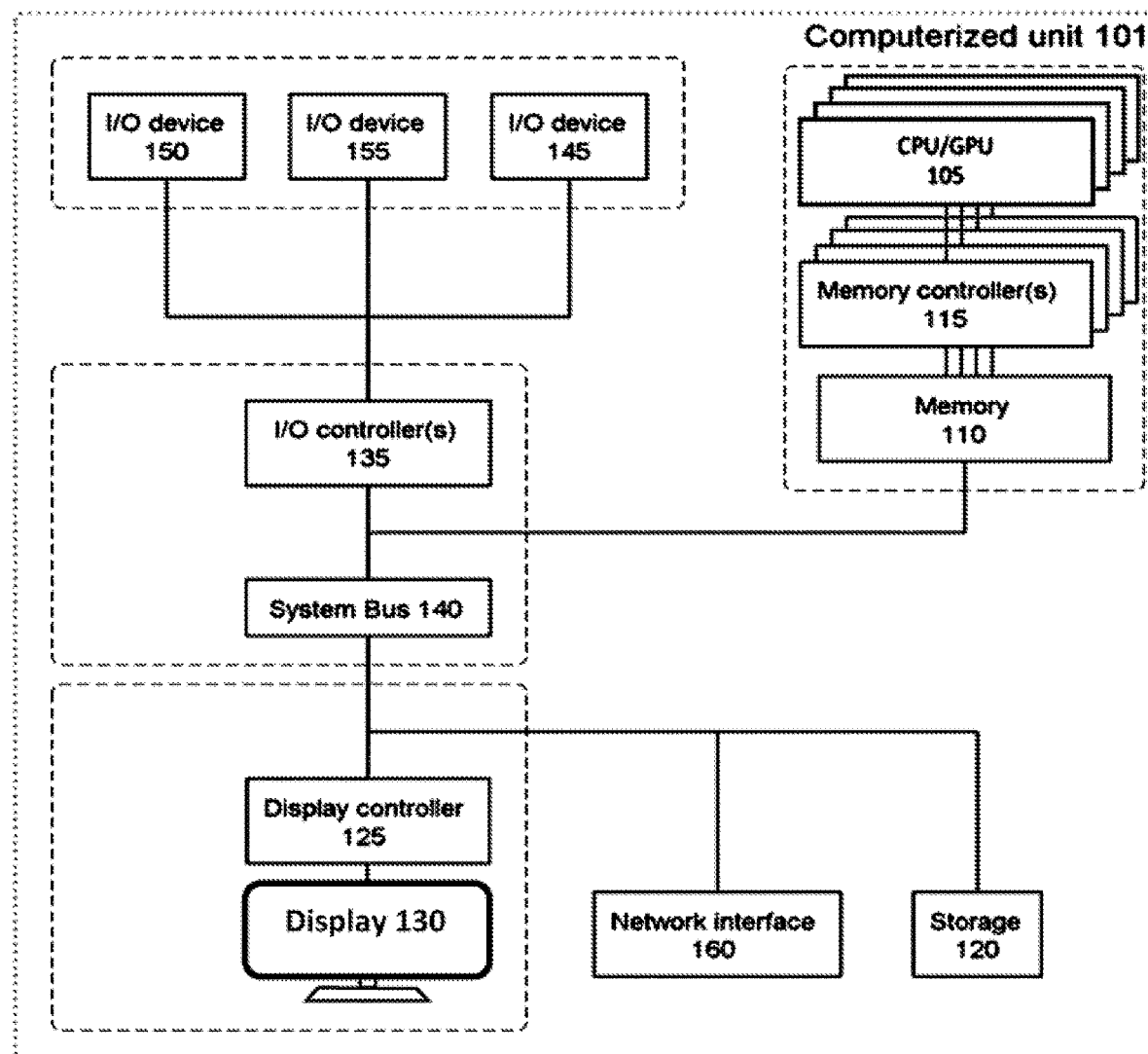
FIG. 11 schematically represents a general-purpose computerized system, suited for implementing one or more method steps as involved in embodiments described herein in accordance with the present disclosure.

The recursive approach adopted in the flows of FIGS. 6 and 7 lends itself well to hardware acceleration. I.e., in embodiments, the execution of the LAYOUT subroutine is at least partly off-loaded to one or more hardware accelerators 4 (see FIG. 1). Each accelerator 4 can be specifically configured for execution of its respective portion of the LAYOUT subroutine. Hardware acceleration 4 is welcome in the present context, inasmuch as the LAYOUT subroutine typically executes repeatedly in the interaction loop. Preferably, the hardware accelerators 4 comprise one or more graphics processing units (GPUs), as shown in FIG. 11. For example, the so-called WebGL API may be used to render the various lines used to depict the edges, to exploit a GPU.

In practice, the present methods may possibly be executed locally on a personal computing device 2, which may exploit a local GPU. In variations thereof, the user 1 may interact with a remote system, e.g., a server 3, via a personal device 2. In turn, the server 3 may off-load repeated computations to a hardware accelerator 4, e.g., a GPU, an application-specific integrated circuit (ASIC), or a field-programmable gate array (FPGA). In other variations, the present methods are provided a cloud service, using a cloud-computing platform (not shown), which may typically rely on containerization technology and possibly involve a disaggregated infrastructure, which includes hardware accelerators 4.

In operation, the user 1 may repeatedly provide inputs, which can in response to the inputs cause updated layout data to be recomputed. An initial layout may typically be computed, prior to receiving any user input. The layout of the initial arborescence may, for example, extend from a default focal node N1, selected at step S13, together with a default attribute. The initial layout can be computed by calling S16 the LAYOUT subroutine with the default focal node and the default pivot attribute selected at step S13.

The user 1 may interact with the GUI, during the interaction loop of steps S14-S18. Thus, the underlying algorithm may notably receive, via the GUI in step S18, a user selection of a focal node N1. This node is typically selected from the displayed nodes of the tree. In turn, the layout of a modified arborescence is computed. The modified arborescence extends from the selected focal node N1, by calling the LAYOUT subroutine in step S16 with the selected focal node. The user 1 may further select a given attribute of the focal node, with which the LAYOUT subroutine is called. Otherwise, the LAYOUT subroutine can be called with a default attribute for the selected node. Various implementations can be contemplated. For example, the user 1 may directly select both a focal node and an attribute thereof by right-clicking on a given node, which causes to display a pull-down menu, in which the user can select the desired attribute of the node. Doing so results in directly selecting both the focal node and the pivot attribute. In some alternative embodiments, statistical methods or natural-language processing (NLP) techniques may be used to suggest potential attributes to the user 1, based on previously selected attributes.

According to another aspect of the present disclosure, the embodiments can be embodied as a computer program product for exploring data. The computer program product comprises a computer readable storage medium having program instructions embodied therewith. The program instructions can for instance be executed by a processor (such as a CPU 105) of a personal computer 2, a server 3, or nodes of a cloud computing platform, to cause the processor to perform steps of methods as described herein, and more specifically, one or more of the steps shown in the exemplary embodiments depicted in FIGS. 6-10. Such methods may possibly be executed in a delocalized fashion, across several computerized devices as further discussed in section 3 of this application.

The above embodiments have been succinctly described in reference to the accompanying drawings and may accommodate a number of variants. Several combinations of the above features may be contemplated. Examples are given in the next section.

2. Specific Embodiments 2.1 Preliminary Remarks

The following describes a simple but efficient algorithm for building layouts of hierarchical graphs. Besides links between nodes, this algorithm uses node attributes to assist the layout building and, as such, facilitates the discovery of hidden data patterns and implicit features of sub-graphs. As a result, it helps the user to build a better understanding of the visualized data.

An interactive application prompts the user to choose a pivot attribute, which is selected among the graph node attributes. In turn, the value of the selected pivot attribute influences the branching of the layout. I.e., the value of the attribute of a parent node 401 is compared with the child node's attributes, whereby subtrees are visually branched out on a port side when the compared values match, otherwise subtrees are visually branched on the starboard side, according to a 2D layout, as described in the previous section. This procedure recursively repeats to build the complete layout.

To avoid branch clashing, the algorithm plots the graph according to a hyperbolic space-like approach, which not only helps in solving clashing issues but also optimizes the available space. Combined with the attribute comparison, the algorithm deterministically generates distinctive visual data fingerprints, built around specific attributes. Information can be overlaid, which notably shows common pivot attribute values across the tree, to help the user to quickly familiarize with the underlying dataset.

In addition, the algorithm visually distinguishes leaf nodes 407 from non-leaf nodes 411 by grouping the leaf nodes 407 into an inflorescence under a common parent node 401. This helps the user declutter the main structural backbone of a hierarchical graph.

The algorithm is sequential, rule-based, and deterministic. As a result, the algorithm generates the same layout for the same data set each time, and small changes in the data will lead to small changes in the resulting layout. This decidedly helps the user with the cognitive mapping and navigation. The resulting user experience markedly differs from experiences resulting from algorithms based on randomization and simulation.

The recursive algorithm allows a fast execution; fairly large hierarchical graphs can be rendered in near-real-time. It is preferably implemented using modern day client-side hardware.

This algorithm can notably be used as part of the so-called Corpus Processing Service (CPS), which is a scalable cloud platform for creating and serving in-memory knowledge graphs (KGs), using NLP at build time and vector manipulation at search time. The purpose of CPS is to process large document corpora, extract the content and embedded facts, and ultimately represent these in a consistent knowledge graph that can be intuitively queried by users. CPS relies on natural language understanding models to extract entities and relationships from the documents. The present approach can notably be used to easily navigate complex, multidimensional hierarchical taxonomies and eases the work of users to quickly use KGs provided as part of the CPS service.

2.2 Step-by-Step Construction of the Arborescence

FIGS. 3A-3H illustrate a step-by-step construction of the layout of an arborescence, according to a preferred embodiment. Note, the following explanations omit optimizations, for simplicity. In particular, while the Figures assume a step-by-step rendering of the nodes and links, the actual rendering procedure can differ at runtime.

Figure 3A:
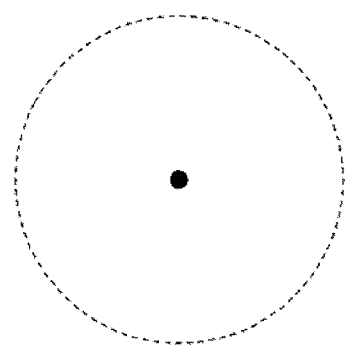
FIGS. 3A-3H depict embodiments of a step-by-step construction of a layout of an arborescence, described herein in accordance with the present disclosure.

In FIG. 3A, the user picks a focal node. The algorithm determines a radius R and an arc (hereafter the "Arc"), which depends on a generation parameter G. The radius R is determined in accordance with the distance between child nodes and the current focal node for the current recursion iteration. I.e., it determines the plotting distance between the parent and its children. Its unit of measure can be decided by the graphics system (e.g., pixels, etc.). The Arc refers to angular boundaries to plot the child nodes of a given node. Its unit can be degrees, rads, etc. The parameter G impacts the plotting distance between the current focal node and a current node. It is expressed as a unit-less integer number.

Figure 3B:
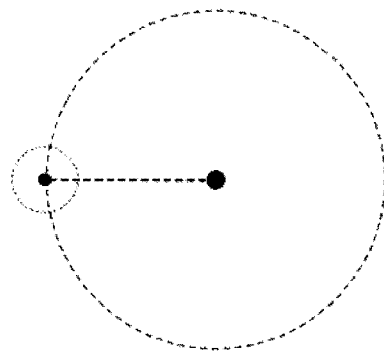

In FIG. 3B, the algorithm identifies a next child node, for which the attribute comparison results in that this node should be plotted in the port region. Because this node is not a leaf node 407 of the tree, its coordinates are determined to lie at the periphery of the circumscribing circle C1 of radius R, as previously determined, in the port-side half circle as viewed from the user's viewpoint. A further circumscribing circle C2 is determined, centered on this child node, in accordance with a further radius and generation parameter. Notice the dimension shrinkage, as explained in section 1 (use is made of a parameter S, which determines the extent of the shrinkage).

Figure 3C:
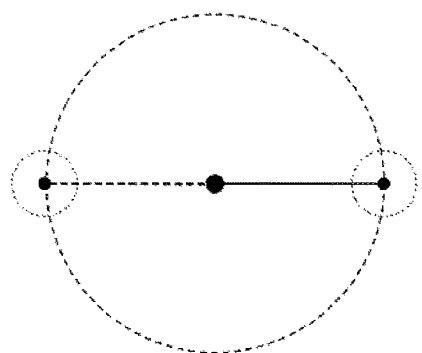
Figure 3D:
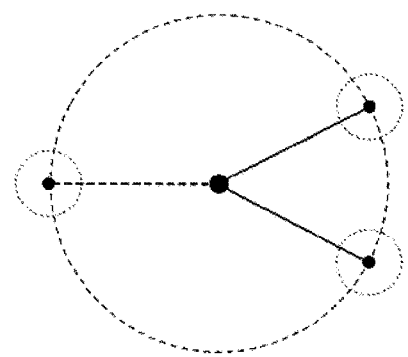
Figure 3E:
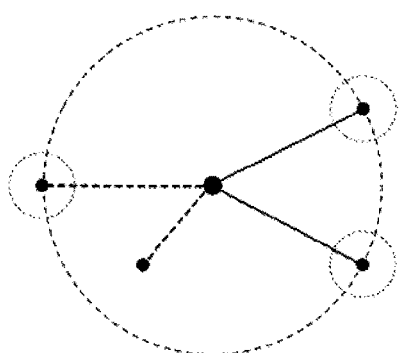
Figure 3F:
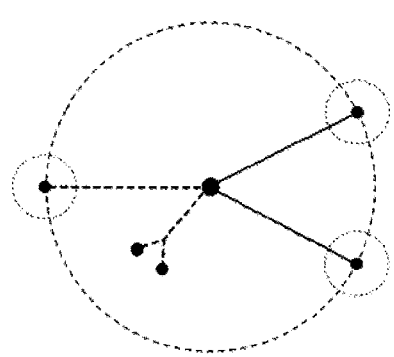
Figure 3G:
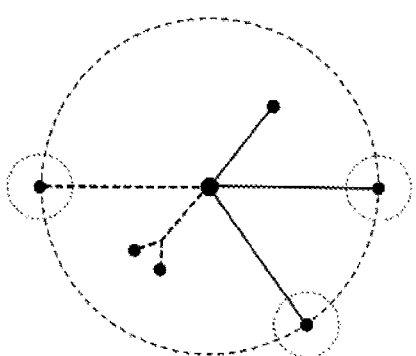
Figure 3H:
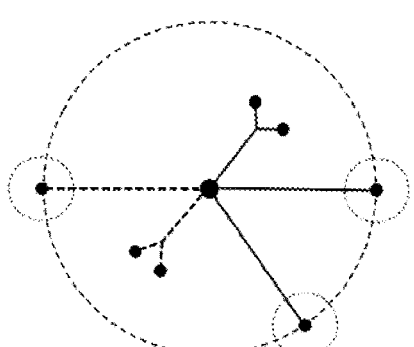

Another non-leaf, child node is similarly identified in FIG. 3C. However, the attribute comparison now tells that this node should be plotted in the starboard region. A further circumscribing circle is accordingly determined, centered on this additional node. A different pattern (plain line) is used to depict the link leading to this node, as opposed to the dashed line used to depict the link in FIG. 3B. A further non-leaf, child node is identified in FIG. 3D, which it is again determined to lie in the starboard region. More generally, every time a further non-leaf node is identified, the same procedure is recursively applied, using updated radii drawing a new circumscribed circle C3 using the radius and generation parameters as shown.

However, a distinct procedure is applied to leaf nodes 407. For instance, a leaf node 407 is identified in FIG. 3E, for which the attribute comparison tells that this node should be plotted in the port region. However, because this node is a leaf node 407, it is plotted in an inner region of the port region defined in the circle C1 centered on the parent node 401. Another leaf node 407 is similarly identified in FIG. 3F, which is again determined to lie in the port region. This node starts forming an inflorescence with the previous leaf node 407 identified. The process goes on similarly in FIGS. 3G and 3H, where further leaf nodes 407 are identified, which are now determined to be plotted as an inflorescence in the starboard, inner region.

2.3 Preferred Flows

The highest-level flow starts at step S10 of FIG. 6. Tree data (nodes, links) are loaded at step S11. At step S12, a default focal node is pre-selected by default, together with a default pivot attribute. The user may request to start an interactive session (S14: Yes), which triggers an interactive loop (S15-S18). Otherwise, the algorithm goes in a stand-by mode (S14: No, then S19). Upon starting the interactive loop, parameters are initialized at step S15, i.e., (G=0, and the first node position is set to {0, 0}. The LAYOUT subroutine is called a first time at step S16 with the pre-selected focal node and its attribute. Additional parameters are passed to or accessed by the subroutine, which parameters include the parameter G, and the node position as set for the focal node. The tree is displayed at step S17, according to the layout computed by the LAYOUT subroutine. The user interacts at step S18 with the modified tree. The user may for example zoom in/out or perform other operations to explore the displayed tree. In some embodiments, the user may want to update the focal node and/or the pivot attribute, which causes the method to loop back to step S14 and run the loop again (S14: Yes).

The LAYOUT subroutine is shown in FIG. 7. The subroutine starts at step S20, e.g., upon calling it from the interaction loop (step S16) or as a result of the recursive process discussed in section 1 (see the discussion below in respect of step S244). At step S21, the subroutine calculates the radius R and the Arc (based on the parameter G), as explained in section 2.1. A loop is started at step S22 to identify child nodes by walking the tree. Each time a new child node is identified (S22: Yes), the attributes of the identified child node are compared with the pivot attribute. I.e., the algorithm checks at step S23 whether the pivot attribute matches the child node attribute (or one of the child node attributes). If this criterion is satisfied (S23: Yes), the child node is assigned to the starboard side of the Arc in step S231. Else it is assigned S232 to the port side of the Arc. Next, step S24 of the algorithm checks whether the identified node is a leaf node. If so (S24: Yes), the node is added during step S241 to a corresponding inflorescence. I.e., the node is stored in an array, with a view to be later processed thanks to the FLOWER subroutine shown in FIG. 8, together with all nodes of the same inflorescence. The algorithm returns back to step S22, to attempt to identify a new child node at the current level. Else (S24: No), the parameter G is increased (e.g., G=G+1) at step S242. The child node position is calculated at step S243. The LAYOUT subroutine is recursively called at step S244 based on the identified child node, the focal node attribute, the updated parameter G, and the child node position, with a view to identifying new child nodes, below the current recursion level. The algorithm may go back to step S22, with a view to possibly identifying a new child node at the current level. The procedure goes on recursively until no more child nodes can be identified. Once no new child node can be identified at step S22 (S22: No), the FLOWER subroutine is called (see FIG. 8) based on the parameters R and Arc, to compute layout data. Note, all nodes belonging to respective inflorescences have been identified at this point, thanks to the iterative process described above (see, in particular, step S241). Thus, the FLOWER subroutine can be called at step S25. Data corresponding to lines and icons of the non-leaf child nodes are subsequently computed by calling the corresponding subroutine (LINES AND ICONS), at step S26. Overlay information is taken care of at step S27, by calling the INFO OVERLAY subroutine. The LAYOUT subroutine ends at step S28.

Figure 8:
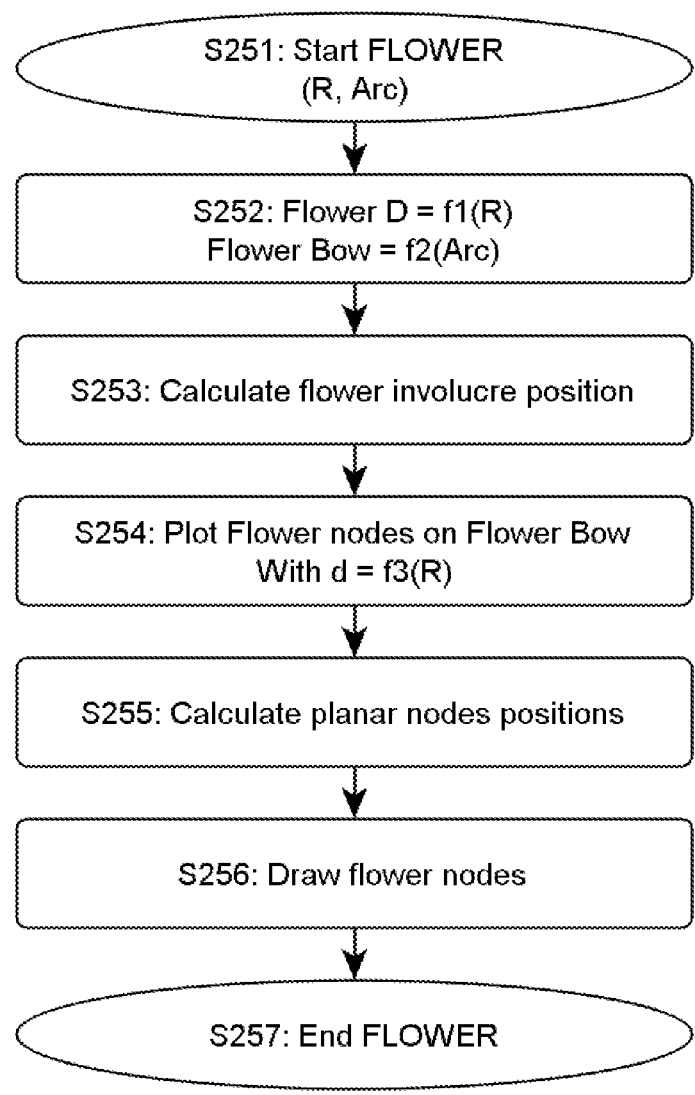
FIG. 8 depicts a flowchart illustrating an embodiment of a FLOWER subroutine of a method for exploring data as described herein in accordance with the present disclosure.

As seen in FIG. 8, the FLOWER subroutine starts at step S251, based on parameters R and Arc. Some quantities are computed at step S252, such as the flower diameter D, based on a function $f_1$ taking the radius R as argument, e.g., $f_2(R)=R/2$. Another function $f_2$ is used to compute the flower bow, i.e., $f_2(Arc)$, which may simply be equal to the Arc value, i.e., $f_2(Arc)=Arc$. The flower involucre 405 position is calculated at step S253. Step S254 provides instructions to plot the flower nodes along the computed flower bow, using a distance computed as, e.g., $d=f_3(R)$, where $f_3(R)=R/4$. The planar nodes positions are subsequently calculated at step S255. The flower nodes are drawn at step S256. The FLOWER subroutine ends at step S257.

The LINES AND ICONS subroutine starts at step S261. Step S262 draws lines between parent positions and children positions. This step, in particular, may advantageously use hardware acceleration. A given level of detail (LOD) is determined at step S263, for both the parent and child nodes, based on parameters that can be determined (e.g., based on the underlying computer system configuration) or preset. Next, the parent icon and the child nodes icons are drawn (steps S264, S265), based on the previously determined level of detail and the node positions. The subroutine ends at step S267.

Figure 9:
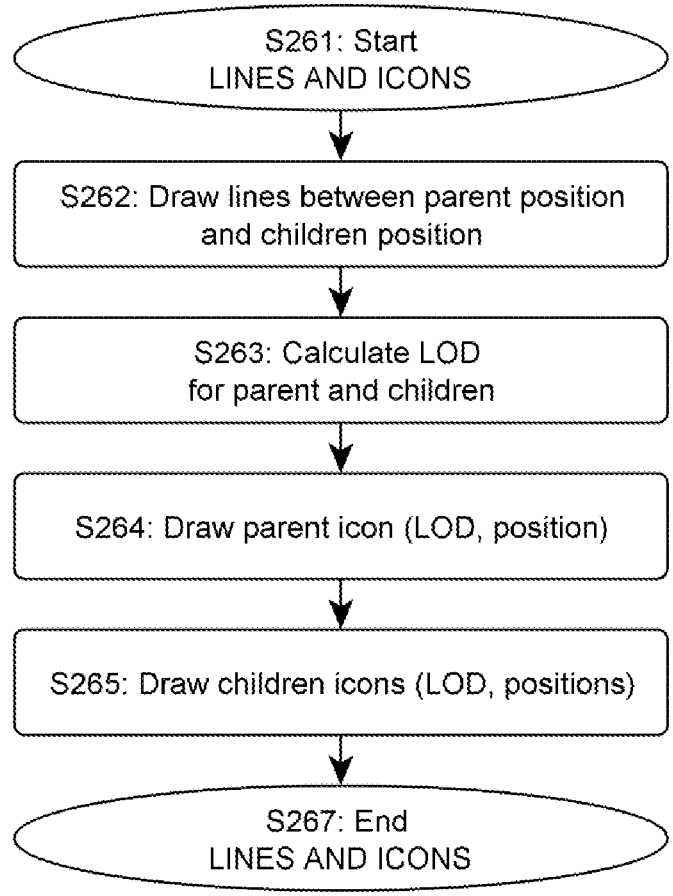
FIG. 9 depicts a flowchart illustrating an embodiment of a LINES AND ICONS subroutine of a method for exploring data as described herein in accordance with the present disclosure.
Figure 10:
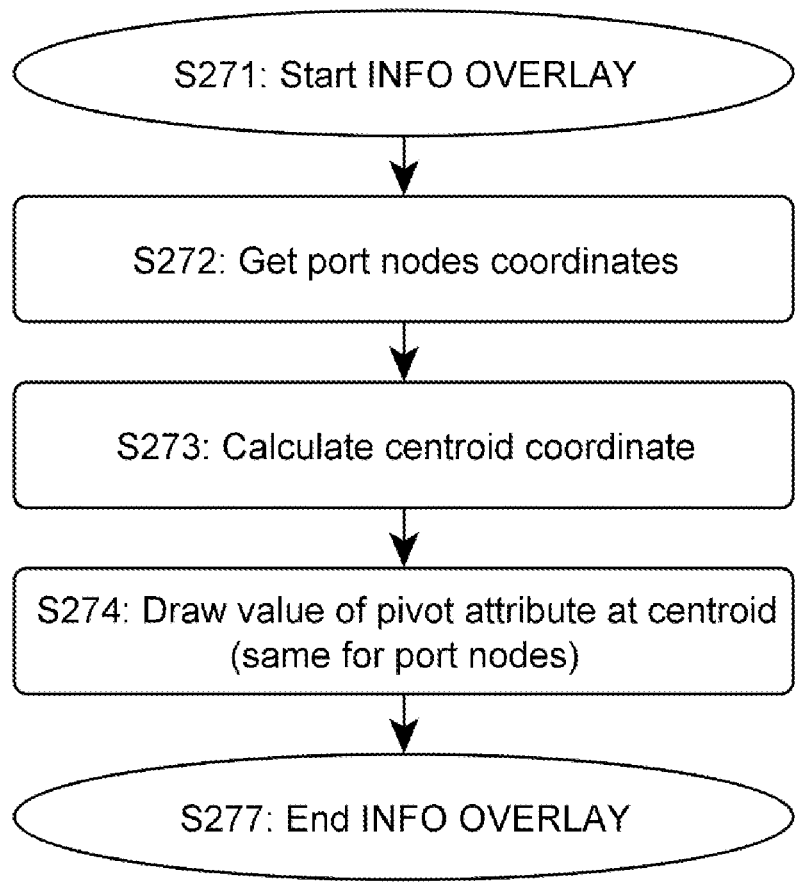
FIG. 10 depicts a flowchart illustrating an embodiment of an INFO OVERLAY subroutine of a method for exploring data as described herein in accordance with the present disclosure.

Finally, the INFO OVERLAY subroutine starts at step S271, as shown in FIG. 9. This subroutine accesses during step S272 the port nodes' coordinates, computes the centroid coordinate in step S273, and finally returns instructions to draw the value of the currently selected pivot attribute at the centroid in step S274, which is the same for all port nodes accessed. The subroutine ends at step S277.

3. Technical Implementation Details

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly-interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention may involve virtual machines and/or general-purpose digital computers, such as personal computers, workstations, etc., are used.

For instance, each of the computerized systems 2 and 3 shown in FIG. 1 may comprise one or more computerized units 101 (e.g., general- or specific-purpose computers), such as shown in FIG. 11. Each unit 101 may interact with other, typically similar units 101, to perform steps according to the present methods.

In exemplary embodiments, in terms of hardware architecture, as shown in FIG. 11, each unit 101 includes at least one processor 105, and a memory 110 coupled to a memory controller 115. Several processors (CPUs, and/or GPUs) may possibly be involved in each unit 101. To that aim, each CPU/GPU may be assigned a respective memory controller, as known per se.

One or more input and/or output (I/O) devices 145, 150, 155 (or peripherals) are communicatively coupled via a local input/output controller 135. The I/O controller 135 can be coupled to or include one or more buses and a system bus 140, as known in the art. The I/O controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software, including instructions such as coming as part of computerized tasks triggered by machine learning algorithms. The processors 105 can be any custom made or commercially available processor(s). In general, they may involve any type of semiconductor-based microprocessor (in the form of a microchip or chip set), or more generally any device for executing software instructions, including quantum processing devices.

The memory 110 typically includes volatile memory elements (e.g., random-access memory), and may further include nonvolatile memory elements. Moreover, the memory 110 may incorporate electronic, magnetic, optical, and/or other types of storage media.

Software in memory 110 may include one or more separate programs, each of which comprises executable instructions for implementing logical functions. In the example of FIG. 11, instructions loaded in the memory 110 may include instructions arising from the execution of the computerized methods described herein in accordance with exemplary embodiments. The memory 110 may further load a suitable operating system (OS) 111. The OS 111 essentially controls the execution of other computer programs or instructions and provides scheduling, I/O control, file and data management, memory management, and communication control and related services.

Possibly, a conventional keyboard and mouse can be coupled to the input/output controller 135. Other I/O devices 145-155 may be included. The computerized unit 101 can further include a display controller 125 coupled to a display 130. The computerized unit 101 may also include a network interface or transceiver 160 for coupling to a network (not shown), to enable, in turn, data communication to/from other, external components, e.g., other units 101.

The network transmits and receives data between a given unit 101 and other devices 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

The present invention may be a method and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Go, Python, Ruby, Scala, Swift, Java, Go, Python, Ruby, Scala, Swift, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method comprising:
    accessing a data structure capturing a connected graph having nodes connected through edges, wherein the nodes are associated with attributes containing human-readable data;
    performing a subroutine comprising:
        receiving a user interaction of selecting a node from the connected graph and an attribute associated with the selected node, wherein the user interacts with a graphical user interface to select the node and the attribute;
        using the selected node as a focal node and the selected attribute as a pivot attribute to determine a layout of an arborescence extending from the focal node;
        identifying other nodes connected to the focal node by walking the connected graph;
        comparing the pivot attribute with attributes associated with the other nodes connected to the focal node to obtain corresponding distance-dependent quantities for each of the other nodes;
        comparing the distance-dependent quantities to a predetermined threshold, respectively, and assigning, based on the comparing to the predetermined threshold, each of the other nodes to one of two distinct regions relative to the starting node, wherein the two distinct regions are complementary three-dimensional regions;
        computing layout data that includes coordinates of the other nodes connected to the focal node, wherein the coordinates are determined in accordance with the distance-dependent quantities and based on the region assignment; and
        displaying, on the graphical user interface, the arborescence according to the layout data as a three-dimensional presentation;
    receiving a user interaction of selecting a new attribute associated with the focal node on the graphical user interface, wherein the user interacts with the graphical user interface to select the new attribute;
    updating the layout data by determining new distance-dependent quantities and new region assignments for the other nodes based on the new attribute; and
    displaying, on the graphical user interface, the arborescence according to the updated layout data.

2. The computer-implemented method according to claim 1, wherein the subroutine is recursively executed at recursion levels of the subroutine's execution, wherein the subroutine is respectively called with each newly selected node identified as the focal node and with the selected attribute.

3. The computer-implemented method according to claim 2, wherein the connected graph is a directed rooted tree, the connected nodes identified are child nodes of the focal node and the selected nodes are non-leaf nodes of the directed rooted tree.

4. The computer-implemented method according to claim 1, wherein the two distinct regions are defined as two complementary halves of a three-dimensional ball centered on the focal node.

5. The computer-implemented method according to claim 4, wherein a dimension of the three-dimensional ball is decreased at each recursion level of repeating the subroutine.

6. The computer-implemented method according to claim 5, wherein recursively executing the subroutine defines a number of spheres, the dimensions of which are determined according to said number, resolving clashes between nodes to be displayed as part of the arborescence.

7. The computer-implemented method according to claim 6, wherein computing the layout data comprises computing the coordinates of the selected nodes in a curvilinear coordinate system.

8. The computer-implemented method according to claim 1, further comprising wherein:
    the region assigned for each node of the other nodes identified is a port region if the respective one of the distance-dependent quantities obtained for said node is less than or equal to the predetermined threshold, otherwise the region assigned is a starboard region; and
    the port region and the starboard region correspond to a port side and a starboard side, respectively, of a direction extending from the focal node to which the identified other nodes are connected.

9. The computer-implemented method according to claim 1, wherein the coordinates are determined so that non-leaf nodes of the identified other nodes are arranged along a periphery of a respectively selected one of the two complementary three-dimensional regions.

10. The computer-implemented method according to claim 1, wherein the coordinates are determined so that leaf nodes of the identified other nodes are arranged in an inner portion of a respectively selected one of the two complementary three-dimensional regions.

11. The computer-implemented method according to claim 10, wherein the coordinates are further determined so that leaf nodes of the identified other nodes, which have a same parent node in said connected graph, form a distinct group of nodes in said inner portion of the respectively selected one of the two complementary three-dimensional regions.

12. The computer-implemented method according to claim 11, wherein the coordinates are further determined so that all leaf nodes in a same distinct group are arranged along a bow and joined by respective edges depicted as pedicels branching from an involucre of a peduncle connected to the same parent node.

13. The computer-implemented method according to claim 2, wherein, at computing the arborescence, the subroutine is recursively executed according to a maximal recursion depth, which is set to be less than a maximal depth of the directed tree from the focal node.

14. The computer-implemented method according to claim 1, wherein the pivot attribute is semantically, syntactically, or numerically compared with the attributes associated with the other nodes identified.

15. The computer-implemented method according to claim 1, wherein comparing the pivot attribute with attributes associated with the other nodes identified comprises testing, for each node of the identified other nodes, whether an associated attribute is equal to the pivot attribute or not.

16. The computer-implemented method according to claim 1, wherein the execution of the subroutine is at least partly off-loaded to a hardware accelerator specifically configured for execution of the subroutine.

17. The computer-implemented method according to claim 1, wherein the method further comprises, prior to executing the subroutine, computing a layout of an initial arborescence extending from a default focal node, by using the default focal node and a default pivot attribute.

18. The computer-implemented method according to claim 1, further comprising:
receiving, via the graphical user interface, a user selection of one of the other nodes from the displayed layout; and
computing a layout of a modified arborescence extending from the selected other node, by calling the subroutine with the selected other node as a new focal node.

19. A computer program product comprising:
one or more computer readable storage media having computer-readable program instructions stored on the one or more computer readable storage media, said program instructions executes a computer-implemented method comprising:
accessing a data structure capturing a connected graph having nodes connected through edges, wherein the nodes are associated with attributes containing human-readable data;
performing a subroutine comprising:
receiving a user interaction of selecting a node from the connected graph and an attribute associated with the selected node, wherein the user interacts with a graphical user interface to select the node and the attribute;
using the selected node as a focal node and the selected attribute as a pivot attribute to determine a layout of an arborescence extending from the focal node;
identifying other nodes connected to the focal node by walking the connected graph;
comparing the pivot attribute with attributes associated with the other nodes connected to the starting node to obtain corresponding distance-dependent quantities for each of the other nodes;
comparing the distance-dependent quantities to a predetermined threshold, respectively, and assigning, based on the comparing to the predetermined threshold, each of the other nodes to one of two distinct regions relative to the starting node, wherein the two distinct regions are complementary three-dimensional regions;
computing layout data that includes coordinates of the other nodes connected to the starting node, wherein the coordinates are determined in accordance with the distance-dependent quantities and based on the region assignment; and
displaying, on the graphical user interface, the arborescence according to the layout data as a three-dimensional presentation;
receiving a user interaction of selecting a new attribute associated with the focal node on the graphical user interface, wherein the user interacts with the graphical user interface to select the new attribute;
updating the layout data by determining new distance-dependent quantities and new region assignments for the other nodes based on the new attribute; and
displaying, on the graphical user interface, the arborescence according to the updated layout data.

20. The computer program product according to claim 19, wherein the subroutine is recursively executed at recursion levels of the subroutine's execution, wherein the subroutine is respectively called with each newly selected node identified as the focal node and with the selected attribute.

* * * * *